Figure 1:
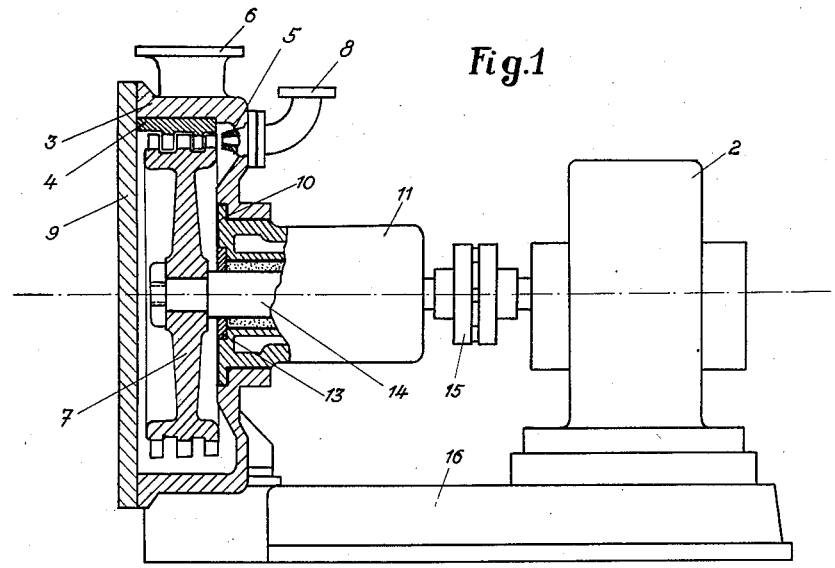

Nov. 10, 1959              A. TILL              2,912,220

MACHINE OR ENGINE WITH ROTARY TURBINE BLADE WHEEL

Filed May 10, 1955

Inventor:
Albert Till
By: Michael S. Striker

United States Patent Office 2,912,220
Patented Nov. 10, 1959

2,912,220

MACHINE OR ENGINE WITH ROTARY TURBINE BLADE WHEEL

Albert Till, Nürnberg, Germany

Application May 10, 1955, Serial No. 507,212
In Germany October 1, 1948

Public Law 619, August 23, 1954
Patent expires October 1, 1968

7 Claims. (Cl. 253—39)

This invention relates to machines or engines with turbine blade wheels for converting the energy transmitting means, and particularly to machines with a rotary operating member, which are known as blowers, turbines, rotary pumps and in which fluids are used as energy transmitting means.

In such machines the rotor, comprising all the rotating parts of the machine is surrounded by a casing which finds the fluid to the rotor. The casing, on which are provided connecting sockets for the feed and exhaust pipes for the fluid is fastened to the base plate or made integral therewith and represents thus a complete unit, forming with its two cover members, a complete enclosure for the rotor. For the purpose of mounting or disassembling the rotor, the casing may be subdivided along a plane parallel to the longitudinal axis of the rotor or along planes which are perpendicular to the rotor axis. In designing these subdivisions, care has been taken to concentrate the connections for the fluid pipes on predetermined elements and to keep them away from other parts so that the machine may be easily assembled and disassembled.

The subdivision of the casing in a plane along the rotor axis makes it possible to mount and dismount the rotor as a unit without taking off the casing from its base plate and without disconnecting the pipes connected to lower half of the casing and the machines coupled to the rotor shaft. It is, however, necessary to take off first the connecting link arranged in the coupling connecting the two halves thereof for simultaneous rotation. From the technical and economical point of view this design requires much space and the manufacturing cost for this construction is rather high.

If, in the contrary, the casing is subdivided in planes perpendicular to the axis of the rotor, the expenditure is much lower as regards construction and cost, but there is the disadvantage that the rotor unit can no longer be mounted or taken out from the machine as a complete unit and independently of the coupled machine and the fluid pipes coupled fastened to the casing. In mounting or taking out the rotor unit of such machines it was so far necessary that the casing or at least parts of it and the pipes connected to the casing or its cover members are removed first. Besides of this the coupled machine had to be taken off. Even with the small units used up to now which have relatively simple shafts and bearing parts, it was, even if the casing with its connecting sockets, and the rotor shaft with the turbine blade wheel and the coupling flange were made as two complete units, not possible to disassemble the parts without moving the engine coupled to the rotor shaft.

These disadvantages are avoided with the machine of the present invention in which a turbine blade wheel on a rotor shaft and the casing with the two connecting pipe sockets from two complete units, which gives the possibility of mounting or taking out the rotor unit, together with its bearings without the necessity of subdividing the casing along a plane extending in axial direction of the rotor shaft in its longitudinal direction and without getting the disadvantages of great requirements in cost and space.

The present invention mainly consists in a rotary fluid handling machine adapted to be used alternately as a pump or turbine comprising, in combination, a shaft, a bladed wheel fixed to the shaft adjacent one end thereof, a coupling flange fixed to the shaft at the other end thereof, and housing means for receiving the shaft, wheel, and flange as a unit through one side of the housing means, surrounding the bladed wheel and supporting the shaft intermediate the bladed wheel and the coupling flange, and the shaft together with the bladed wheel and the coupling flange fixed thereon being removable as a unit through the one side of the housing means.

The housing means of the machine preferably comprises a pair of outer side walls, one of which is composed at least in part of a wall portion whose periphery is located further from the axis of the shaft than the periphery of the bladed wheel and the other of which is composed at least in part of another wall portion whose periphery is located further from the axis of the shaft than the periphery of the coupling flange and nearer to the axis of the shaft than the periphery of the wheel. Both of these wall portions are removably connected to the remainder of the housing. Bearing means are formed in the smaller wall portion for supporting the shaft for rotation about its axis intermediate the wheel and the coupling flange. Thereby, it is possible, after disconnecting the side wall portion from the remainder of the housing, to remove the rotor unit, that is the shaft together with the bladed wheel and the coupling flange, and the wall portion on which the bearing means are formed, in axial direction out of the housing while leaving the other elements of the machine in place. A removal or shifting of any unit coupled to the rotor unit of the machine is also not necessary when the rotor unit is being removed from the machine.

For a better understanding of the invention, reference should be had to the accompanying drawings showing two embodiments of the machine according to the invention.

Figure 2:
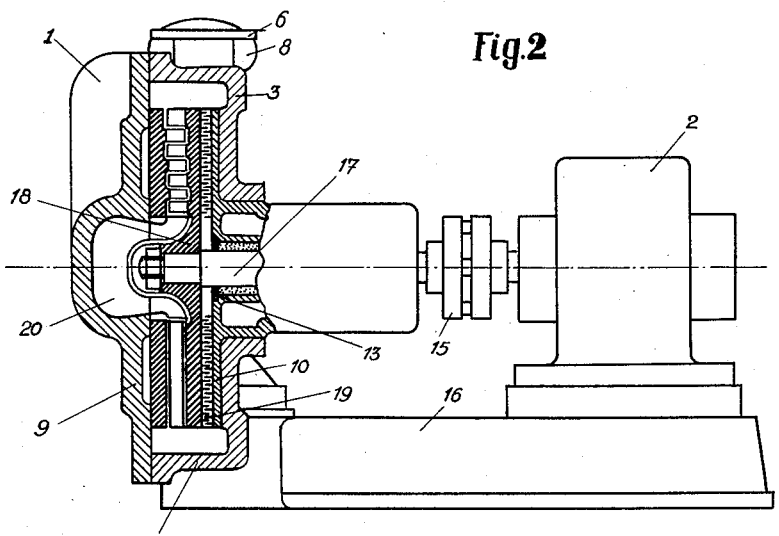
Figure 3:
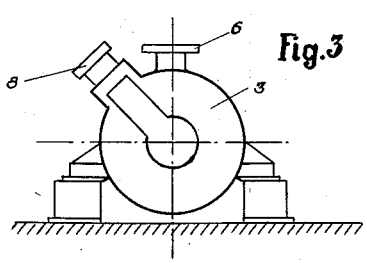

Fig. 1 is an elevational view, partly in section, of a machine with a rotor to which the energy transmitting means is axially admitted, Fig. 2 is a similar view of a machine with a rotor to which the energy transmitting means is admitted radially, and Fig. 3 is an end view of the machine illustrated in Fig. 2.

The aggregate of the embodiment according to Fig. 1 comprises a machine 1 in which the energy transmitting means or fluid to be converted by the turbine blade wheel is admitted to this latter in tangential direction. Coupled to the rotor shaft 14 of the machine 1 is a unit 2 mounted on the same frame 16 as the machine 1. When the machine 1 is used as turbine, the unit 2 may be a gear unit for power transmission or a generator directly driven by the turbine 1. If the machine 1 is used as pump then the unit 2 is exchanged against a drive motor for the pump.

The machine 1 comprises a casing or housing 3 with a guiding device 4 and a jet 5 arranged in the interior of said casing. On top of the casing is arranged a socket 6 for the fluid discharge conduit and at the side of the casing is a socket 8 for the fluid inlet conduit. The sockets 6 and 8 form conduit means fixedly connected to the housing 3 and communicating with the interior of housing 3 for guiding the fluid in and out of this housing. The housing 3 has a pair of outer side walls and the left side wall, as viewed in Fig. 1 is formed of a wall portion or cover 9 whose periphery is located further from the axis of shaft 14 than the periphery of the bladed wheel 7. The other side wall is composed in part of a wall portion 12 whose periphery is located further from the axis of the shaft 14 than the periphery of the coupling flange 15 but nearer to the axis of the shaft than the periphery of the wheel 7. The wall portions 9 and 12 are removably connected in any well known manner to the remainder of the housing 3. A bearing 11 is formed in the wall portion 12 and preferably integrally cast therewith. This bearing 11 forms a support for the rotor and provided with a flange 10, bearing in a recess against the inner surfaces of the casing and sealing the casing completely at this side. At the same time the necessary packing 13 is arranged in the cover 12 and this packing can equally be inserted from the side of the casing remote from the motor. For this purpose it is only necessary to pull off the turbine blade wheel from the shaft and to insert the packing material with its support in the space provided for this purpose. In this way the casing 3 with the two joining sockets 6 and 8 represent a complete unit, ready for work, forming a part of a machine for itself.

In the interior of the casing 3 the rotor is arranged, which consists of the turbine blade wheel 7, the rotor shaft 14 and the coupling flange 15 mounted on said rotor shaft, which is connected in known manner with the flange mounted on the shaft of the power transmission gear respectively the source of the driving power. The rotor has its main bearing at 11 and may furthermore be supported by a guide bearing (not represented) which will preferably be arranged in the cover member 9. Thus the rotor with the turbine blade wheel 7, the shaft 14, the main bearing 11 and the coupling flange 15 represents again a complete unit, ready for work, forming a part of a machine for itself. The casing 15 as well as the power transmission gear respectively the source of power 2 are mounted on a base plate 16.

After the cover member 9 at the front has been unscrewed, the rotor, forming with its main bearing 11 a complete unit, ready for work, for itself, can be taken out as a unit without any necessity of taking off first the coupling members and the coupled machine or the power transmission gear and the pipes or parts of the casing containing the energy transmitting means.

The aggregate of the embodiment according to Fig. 2 shows as a machine 1 a construction in which the energy transmitting means to be converted by the turbine blade wheel is admitted to this latter radially. In this case the rotar comprises the axial turbine blade wheel 18 fixed on the rotor shaft 17. For the purpose of sealing the turbine blade wheel 18 against the fixed casing, it is possible to increase the flange 10 at the rear cover member 12 up to the diameter of the turbine blade wheel in order to arrange there a seal 19. For the feeding of the energy transmitting means to the turbine blade wheel a collector chamber 20 is used, which is arranged in the cover member 10 at the front side and which is connected with the feed joining socket 8. This socket 8 and the exhaust joining socket 6 are arranged in different planes, as can be seen in Fig. 3, in order not to interfere with each other.

The taking out of the rotor is done in this case in the same manner as in Fig. 1, so that this machine part can be taken out as a complete unit.

It is obvious that the invention is not limited to the embodiment described hereinbefore and represented in the drawings, but that different modifications can be realized. Thus the coupling 15 and the main bearing 11 with the rotor shaft 14 respectively 17 can be left away, so that the motor 2 will be spaced in closer relationship to the casing 3 and the turbine blade wheel 7 respectively 18 will be arranged directly on the stub of the motor shaft. The bearings of the machine 2 assume then the supplementary load caused by the turbine blade wheel 7 respectively 18, while the casing 3 respectively its cover member 12 will be used only for the purpose of closing. The sealing is done in the same manner as before by means of packings 13 which are inserted from the interior of the machine, said packings consisting of the packing material and its supporting means and being arranged eventually around a conveniently designed hub of the turbine blade wheel.

What I claim is:

1. A rotary fluid handling machine adapted to be used alternately as a pump or turbine, comprising, in combination, a shaft; a bladed wheel fixed to said shaft adjacent one end thereof; a coupling flange fixed to the shaft at the other end thereof; a housing surrounding said bladed wheel and having a pair of outer side walls one of which is composed at least in part of a wall portion whose periphery is located further from the axis of the shaft than the periphery of said bladed wheel and the other of which is composed at least in part of another wall portion whose periphery is located further from the axis of said shaft than the periphery of said coupling flange and nearer to the axis of said shaft than the periphery of said wheel, said wall portions being removably connected to the remainder of said housing; bearing means formed in said other wall portion for supporting said shaft for rotation about its axis intermediate said bladed wheel and said coupling flange; and conduit means fixedly connected to said housing at points spaced from said movable wall portions thereof and communicating with the interior of said housing for guiding the fluid adapted to cooperate with said bladed wheel in and out of said housing, whereby upon disconnecting of said wall portions from the remainder of said housing said shaft together with said bladed wheel, said coupling flange and said other wall portion including the bearing means may be removed in axial direction out of said housing while leaving the other elements of the machine in place.

2. A rotary fluid handling machine adapted to be used alternately as a pump or turbine, comprising, in combination, a shaft; a bladed wheel fixed to said shaft adjacent one end thereof; a housing surrounding said bladed wheel and having a pair of outer side walls one of which is composed at least in part of a wall portion whose periphery is located further from the axis of the shaft than the periphery of said bladed wheel and the other of which is composed at least in part of another wall portion whose periphery is located further from the axis of said shaft than the periphery of said coupling flange and nearer to the axis of said shaft than the periphery of said wheel, said wall portions being removably connected to the remainder of said housing, said other wall portion having a peripheral flange abutting against the inner face of said housing; packing means located in said other wall portion and facing the interior of said housing; bearing means formed in said other wall portion for supporting said shaft for rotation about its axis intermediate said bladed wheel and said coupling flange; and conduit means fixedly connected to said housing at points spaced from said movable wall portions thereof and communicating with the interior of said housing for guiding the fluid adapted to cooperate with said bladed wheel in and out of said housing, whereby upon disconnecting of said wall portions from the remainder of said housing said shaft together with said bladed wheel, said coupling flange and said other wall portion including the bearing means may be removed in axial direction out of said housing while leaving the other elements of the machine in place.

3. A rotary fluid handling machine adapted to be used alternately as a pump or turbine, comprising, in combination, a shaft; a bladed wheel fixed to said shaft adjacent one end thereof; a coupling flange fixed to the shaft at the other end thereof; a housing surrounding said bladed wheel and having a pair of outer side walls one of which is composed at least in part of a wall portion whose periphery is located further from the axis of the shaft than the periphery of said bladed wheel and the other of which is composed at least in part of another wall portion whose periphery is located further from the axis of said shaft than the periphery of said coupling flange and nearer to the axis of said shaft than the periphery of said wheel, said wall portions being removably connected to the remainder of said housing; bearing means formed in said other wall portion for supporting said shaft for rotation about its axis intermediate said bladed wheel and said coupling flange, said other wall portion and said bearing means being cast integrally with each other; and conduit means fixedly connected to said housing at points spaced from said movable wall portions thereof and communicating with the interior of said housing for guiding the fluid adapted to cooperate with said bladed wheel in and out of said housing, whereby upon disconnecting of said wall portions from the remainder of said housing said shaft together with said bladed wheel, said coupling flange and said other wall portion including the bearing means may be removed in axial direction out of said housing while leaving the other elements of the machine in place.

4. A rotary fluid handling machine adapted to be used alternately as a pump or turbine, comprising, in combination, a shaft; a bladed wheel fixed to said shaft adjacent one end thereof; a coupling flange fixed to the shaft at the other end thereof; a housing surrounding said bladed wheel and having a pair of outer side walls one of which is composed at least in part of a wall portion whose periphery is located further from the axis of the shaft than the periphery of said bladed wheel and the other of which is composed at least in part of another wall portion whose periphery is located further from the axis of said shaft than the periphery of said coupling flange and nearer to the axis of said shaft than the periphery of said wheel, said wall portions being removably connected to the remainder of said housing, said other wall portion having a peripheral flange abutting against the inner face of said housing; packing means located in said other wall portion and facing the interior of said housing; bearing means formed in said other wall portion for supporting said shaft for rotation about its axis intermediate said bladed wheel and said coupling flange, said other wall portion and said bearing means being cast integrally with each other; and conduit means fixedly connected to said housing at points spaced from said movable wall portions thereof and communicating with the interior of said housing for guiding the fluid adapted to cooperate with said bladed wheel in and out of said housing, whereby upon disconnecting of said wall portions from the remainder of said housing said shaft together with said bladed wheel, said coupling flange and said other wall portion including the bearing means may be removed in axial direction out of said housing while leaving the other elements of the machine in place.

5. A rotary fluid handling machine adapted to be used alternately as a pump or turbine, comprising, in combination, a shaft; a bladed wheel fixed to said shaft adjacent one end thereof; a coupling flange fixed to said shaft at the other end thereof; a housing surrounding said bladed wheel and having a pair of outer side walls one of which is composed at least in part of a wall portion whose periphery is located further from the axis of the shaft than the periphery of said bladed wheel and the other of which is composed at least in part of another wall portion whose periphery is located further from the axis of said shaft than the periphery of said coupling flange and nearer to the axis of said shaft than the periphery of said wheel, said wall portions being removably connected to the remainder of said housing; bearing means formed in said other wall portions for supporting said shaft for rotation about its axis intermediate said bladed wheel an said coupling flange; and conduit means fixedly connected to said housing at points spaced from said movable wall portions thereof and communicating with the interior of said housing for guiding the fluid adapted to cooperate with said bladed wheel in and out of said housing, said movable wall portion of said one side wall being formed with a fluid collector chamber and with fluid guide means connecting said collecting chamber with said conduit means, whereby upon disconnecting of said wall portions from the remainder of said housing said shaft together with said bladed wheel, said coupling flange and said other wall portion including the bearing means may be removed in axial direction out of said housing while leaving the other elements of the machine in place.

6. A rotary fluid handling machine adapted to be used alternately as a pump or turbine, comprising, in combination, a shaft; a bladed wheel fixed to said shaft adjacent one end thereof; a coupling flange fixed to said shaft at the other end thereof; a housing surrounding said bladed wheel and having a pair of outer side walls one of which is composed at least in part of a wall portion whose periphery is located further from the axis of the shaft than the periphery of said bladed wheel and the other of which is composed at least in part of another wall portion whose periphery is located further from the axis of said shaft than the periphery of said coupling flange and nearer to the axis of said shaft than the periphery of said wheel, said wall portions being removably connected to the remainder of said housing; bearing means formed in said other wall portions for supporting said shaft for rotation about its axis intermediate said bladed wheel and said coupling flange; conduit means fixedly connected to said housing at points spaced from said movable wall portions thereof and communicating with the interior of said housing for guiding the fluid adapted to cooperate with said bladed wheel in and out of said housing; and guide means located within said housing adjacent said movable wall portion of said one side wall and removable therewith and cooperating with said conduit means for guiding the fluid to said bladed wheel, whereby upon disconnecting of said wall portions from the remainder of said housing said shaft together with said bladed wheel, said coupling flange and said other wall portion including the bearing means may be removed in axial direction out of said housing while leaving the other elements of the machine in place.

7. A rotary fluid handling machine adapted to be used alternately as a pump or turbine, comprising, in combination, a shaft; a bladed wheel fixed to said shaft adjacent one end thereof; a coupling flange fixed to said shaft at the other end thereof; a housing surrounding said bladed wheel and having a pair of outer side walls one of which is composed at least in part of a wall portion whose periphery is located further from the axis of the shaft than the periphery of said bladed wheel and the other of which is composed at least in part of another wall portion whose periphery is located further from the axis of said shaft than the periphery of said coupling flange and nearer to the axis of said shaft than the periphery of said wheel, said wall portions being removably connected to the remainder of said housing; bearing means formed in said other wall portions for supporting said shaft for rotation about its axis intermediate said bladed wheel and said coupling flange; packing means located in said other wall portion, facing the interior of said housing and cooperating with said bladed wheel; and conduit means fixedly connected to said housing at points spaced from said movable wall portions thereof and communicating with the interior of said housing for guiding the fluid adapted to cooperate with said bladed wheel in and out of said housing, said movable wall portion of said one side wall being formed with a fluid collector chamber and with fluid guide means connecting said collecting chamber with said conduit means, whereby upon disconnecting of said wall portions